Patented Oct. 27, 1931

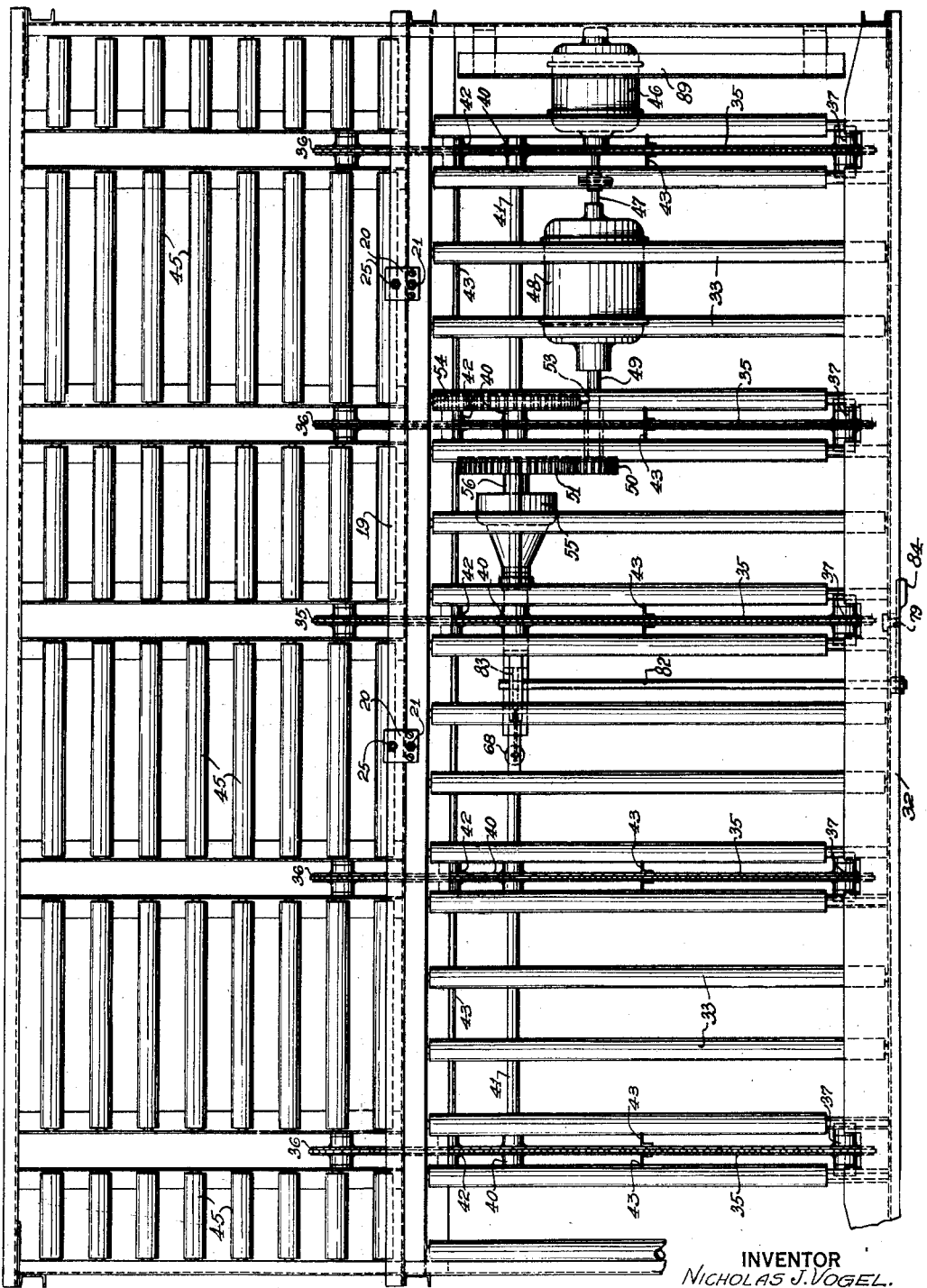

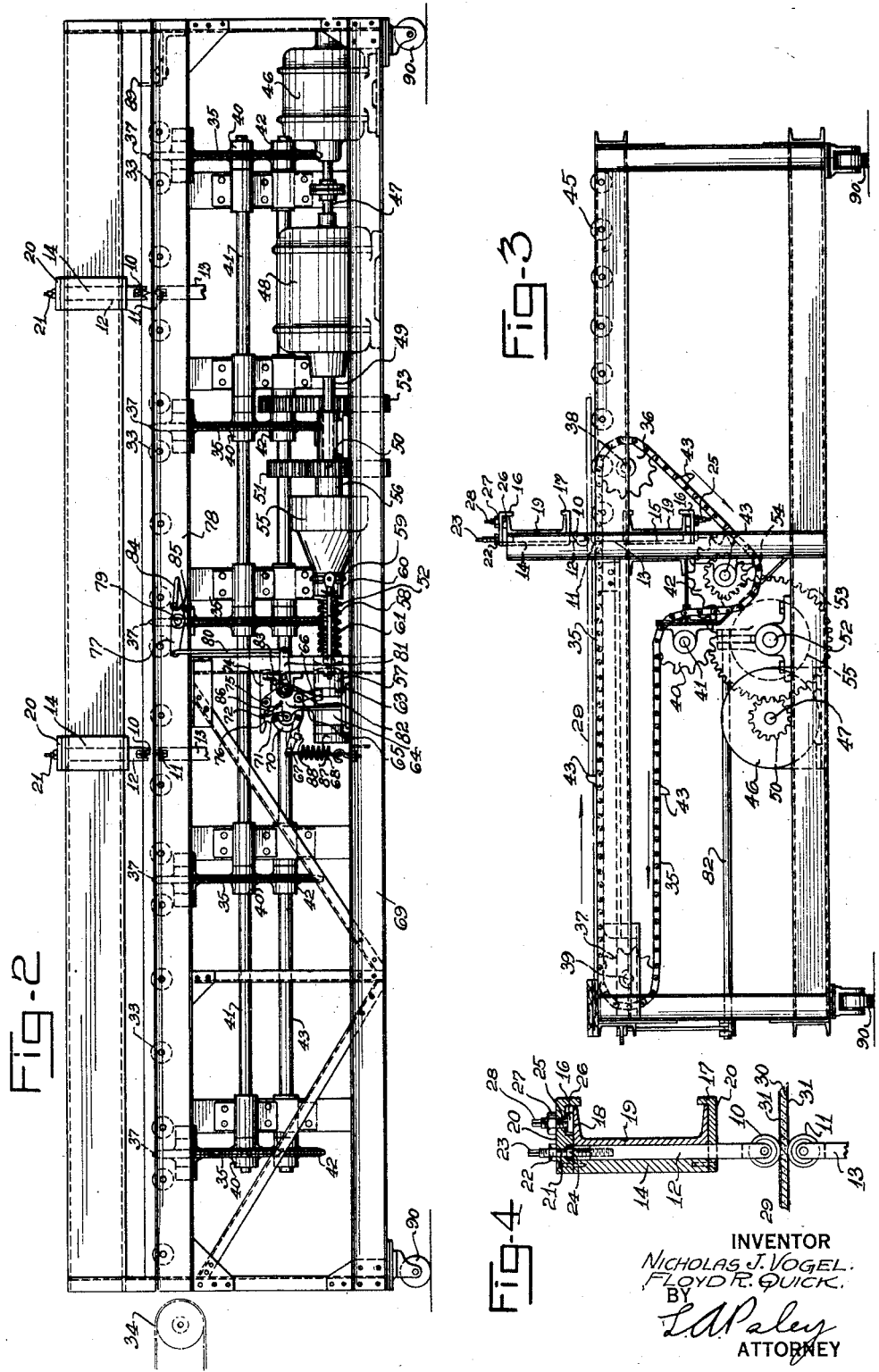

1,829,075

UNITED STATES PATENT OFFICE

NICHOLAS J. VOGEL AND FLOYD R. QUICK, OF FORT DODGE, IOWA, ASSIGNORS TO UNITED STATES GYPSUM COMPANY, OF CHICAGO, ILLINOIS, A CORPORATION OF ILLINOIS

BOARD CUTTING MACHINE

Application filed April 6, 1929. Serial No. 352,948.

This invention relates to machines for the trimming or cutting of sheet material and has reference more particularly to machines of the class described in which sheet material, such as plaster board, is passed between oppositely disposed cutters to cut said board into predetermined lengths.

Plaster boards are usually constructed with a cementitious core material covered on both faces with a heavy sheet of paper. These plaster boards often come in large sizes and are rather awkward to handle and difficult to cut along straight lines. It is also difficult to cut both paper cover sheets along a single line so as to make a smooth cut on the board.

An object of this invention, therefore, is to provide a machine for cutting plaster boards to predetermined lengths.

Another object of this invention is to cut both sheets of the plaster board simultaneously so as to obtain a smooth cut edge; also to improve sheet cutting machines in other respects hereinafter specified and claimed.

Reference is to be had to the accompanying drawings forming a part of this specification, in which Fig. 1 is a plan view of our improved cutting machine.

Fig. 2 is an end elevation of the cutting machine.

Fig. 3 is a side elevation of the machine, and

Fig. 4 is a detailed sectional view of the cutting device.

In the preferred embodiment of our invention, the cutting machine consists of a pair of cutting wheels 10 and 11 which are spaced apart and rotatably mounted on square spindles 12 and 13 respectively. Each of the spindles 12 and 13 is mounted for vertical sliding movement in brackets 14 and 15 respectively, said brackets being substantially U-shaped in cross section and having inturned shoulders 16 and 17 which engage the flanges 18 of channel beam 19. One leg 20 of each of the brackets 14 is provided with an opening for the reception of a stud 21, the latter being threaded on its outer end to receive a nut 22 and being also provided with a square end 23 for the application of a wrench. Stud 21 is also provided with an annular shoulder 24 which engages the leg 20 so as to limit the movement of the stud 21 axially. The lower end of each stud 21 is threaded to engage in a tapped hole formed in the upper end of spindle 12 and spindle 13 is also provided with the same arrangement. The distance between bracket leg 20 is sufficient to give a sliding fit with the flanges 18 of beam 19 and in order to secure the bracket 14 in any adjusted position, a stud 25 passes through the leg 20 and has a head 26 which bears against the upper surface of flange 18. The stud 25 is threaded into a tapped hole in the leg 20 and a lock nut 27 is provided on said stud to prevent the inadvertent rotation thereof. The stud 25 is also provided with a square head 28 for the application of a wrench. A plurality of brackets 14 may be provided on the beams 19 so that any number of cuts may be taken simultaneously across a plaster board 29. Said plaster board is usually provided with a cementitious core material 30 usually composed of gypsum, with paper cover sheets 31 on each face thereof and the knives 10 and 11 are spaced apart a distance to cut said cover sheets.

These gypsum boards 29 are deposited on a roller conveyor 32 which has a plurality of rollers 33, by means of a delivery belt 34, or manually. A plurality of chains 35 are movably mounted between the rollers 33, said chains passing over idler sprocket wheels 36 and 37 which in turn are secured on rotatably mounted shafts 38 and 39 respectively. The chains 35 also pass over idler sprocket wheels 40 secured to a rotatably mounted shaft 41 and around drive sprocket wheels 42 which are secured on a countershaft 43. The chains 35 are provided with special links having shoulders 43 which extend outwardly from the chain and engage the end of plaster board 29 so as to move said plaster board longitudinally of the rollers 33 and between the cutting knives 10 and 11 so as to cut the paper cover sheets of the plaster board. After the boards are cut, they move on to rollers 45 where they may be given a light blow manually to break the cementitious core material 30 and thus sever the board into the desired number of smaller boards.

Any suitable means may be provided for causing the movement of the chains, such as a motor 46 which is connected by shaft 47 to a speed reducer 48, the latter being provided with a driven shaft 49. A pinion 50 is secured on the shaft 49 and meshes with a gear 51 which is secured to a sleeve 56. A second gear 53 is secured to the shaft 52 and meshes with a pinion 54 which is secured to the shaft 43.

A clutch 55 is mounted concentric with the shaft 52 and one section of said clutch is secured to a sleeve 56, also concentric with said shaft. A collar 57 is slidably but not rotatably mounted on the shaft 52 and is connected by rods 58 to the friction plates inside of the clutch 55 by the collar 59 which is slidably but not rotatably mounted upon shaft 52. A collar 60 is rigidly secured to the shaft 52 and a spring 61 is mounted on said shaft between the collar 60 and the collar 57 so that the collar 57 is urged to the left as seen in Fig. 2 by said spring, thus tending to normally keep the clutch out of engagement.

A bearing 62 rotatably supports the shaft 52 and is provided on one annular edge with a cam surface having a shoulder 63 which engages a similar shoulder on the collar 57 when the clutch is in operative position. A bell crank lever is pivotally mounted upon a bracket 64 by means of a pin 65, said lever having one arm 66 which engages in a socket in the bearing 62 and bears against the collar 57. The other arm 67 of said bell crank lever, is connected by a spring 68 to a rigid frame work 69 of the machine so that the bell crank lever is normally urged to move in a counter-clockwise direction as seen in Fig. 2.

An arcuate link 70 is pivotally connected between the lever arm 67 and a catch 71, the latter being pivotally connected by pin 72 to the bracket 64. A catch lever 74 is pivotally connected by a pin 75 to the bracket 64. The lever 74 is provided with a catch shoulder 76 which engages the end of catch 71 and prevents the counter-clockwise movement of said catch and the lever arm 67 under the action of spring 68. A control lever 77 is pivotally connecetd to frame work 78 by a pin 79. One end of lever 77 is connected by rod 80 to one end of a lever 81, the latter being secured on a shaft 82 which is rotatably supported in the bracket 64. A lever arm 83 is mounted on the inner end of shaft 82 and said arm 83 is connected by a link with the lever 74 so that when an operating handle 84 on the lever 77 is manually raised against the action of a spring 85, the catch shoulder 76 is disconnected from the end of the catch 71 so that the lever arm 67 moves in a counter-clockwise direction under the action of spring 68 thus actuating the clutch and causing the movement of the chains 35 until shaft 62 has made one revolution. The actuation of lever arm 67 moves the collar 57 to the right as seen in Fig. 2 so that the clutch plates are engaged and cause the rotation of collar 57, the cam shoulders 63 being disengaged by the rotation of said collar 57 so that the clutch is maintained in engagement for one revolution without further pressure of lever arm 66.

A spring 86 connects the lever 74 to the bracket 54 so that the catch shoulder 76 is normally maintained in contact with the end of catch 71. A cam 87 is secured to the end of shaft 52 and said cam engages a roller 88 rotatably mounted on lever arm 67 during each revolution of shaft 52 so as to restore the catch 71 behind the catch shoulder 76 ready for a new cutting operation. A stop 89 is secured to the frame work of the machine so as to limit the movement of the plaster boards into the machine and adjust their position relative to the cutting knives 10 and 11. Casters 90 are provided to support the framework of the machine and make same portable but these casters may be removed when the machine is in operation so as to hold same stationary on the floor.

In operation the plaster boards 29 are deposited upon the rollers 33, either manually or by means of the conveyor 34. The operator then pulls upwardly on the operating handle 84 which actuates lever 77, rod 80, lever 81, shaft 82, lever arm 83 and lever 74 so as to disconnect the catch shoulder 76 from the end of catch 71. The catch 71 is now moved downwardly by lever arm 67 under the action of spring 68 so that lever arm 66 moves collar 57 to the right, thus causing the engagement of the clutch plates and causing the rotation of collar 57, rods 58 and collar 59, with the sleeve 56. The sleeve 56 is rotated continuously by motor 46 acting through speed reducer 48, and shaft 49, said shaft being provided with pinion 50 connecting with gear 53 on said sleeve 56. The gear 53 on shaft 52 now causes the rotation of pinion 54, shaft 43 and drive sprocket wheel 42, thus causing the movement of chains 35 about idler sprocket wheels 36, 37 and 40. The movement of the chains causes the lugs 43 to engage the edge of the plaster board 29 and push said plaster board inwardly between cutting knives 10 and 11 which are adjusted at proper positions along the supporting beam 19 to give the desired lengths of finished plaster board. The knives 10 and 11 cut the paper cover sheets 31 of the plaster board and after cutting, the plaster boards pass on to rollers 45 after which they are manually removed from the machine, being then cut to the desired length.

While the foregoing description discloses a certain embodiment of our invention, we do not wish to limit ourselves precisely to these details, since manifestly the same can be considerably varied without departing from the spirit of the invention as described in the appended claims.

Having thus described our invention, we claim as new and desire to secure by Letters Patent:

1. In a trimming machine, a pair of parallel beams in spaced relation, adjustable U-shaped holders positioned on said beams, rotary cutting knives on said holders adapted to be adjusted longitudinally of said beams, and means for moving sheet material past said cutting knives to accomplish the cutting thereof.

2. In a cutting machine, a pair of parallel beams in spaced relation, a plurality of U-shaped brackets slidably associated with said beams, means for clamping said brackets in adjusted positions along said beams, a spindle adjustably associated with each of said brackets, rotary cutting knives mounted on each spindle, said spindles being positioned so that the cutting knives are spaced apart a distance somewhat less than the thickness of the sheet material to be cut, and means for moving sheet material between said cutting knives to accomplish the cutting thereof.

3. In a cutting machine, a frame work, rotary cutting knives adjustably supported on said frame work, an endless conveyor element adjacent said cutting means, a motor supported on said frame work, driving means connecting said motor to said conveyor element, a clutch associated with said driving means, a control element associated with said clutch and adapted to be manually actuated so as to cause movement of said conveyor element and to cause sheet material to be moved past said cutting means to accomplish the cutting thereof, and means for disconnecting said clutch and stopping the movement of said conveyor element after a predetermined movement thereof.

4. In a cutting machine, a frame work, U-shaped brackets slidably and adjustably supported by said frame work, cutting means adjustably supported by said brackets, driving means including a clutch supported by said frame work, a shaft associated with said clutch, a conveyor element supported by said frame work, connecting means adapted to cause the movement of said conveyor element and material adjacent said cutting means when said clutch is manually actuated, a lever adapted to cause the actuation of said clutch and a cam associated with said shaft adapted to restore said lever to normal position after a revolution of said shaft so as to stop the movement of said conveyor element.

NICHOLAS J. VOGEL.
FLOYD R. QUICK.